UNITED STATES PATENT OFFICE.

RALPH D. PECK, OF DANVILLE, WISCONSIN.

SMOKELESS POWDER.

No. 806,564.  Specification of Letters Patent.  Patented Dec. 5, 1905.

Application filed September 8, 1905. Serial No. 277,587.

*To all whom it may concern:*

Be it known that I, RALPH D. PECK, a citizen of the United States, residing at Danville, in the county of Dodge and State of Wisconsin, have invented certain new and useful Improvements in Smokeless Powder; and I do hereby declare the following to be a full, clear, and exact description of the invention, such as will enable others skilled in the art to which it appertains to make and use the same.

My invention relates to gunpowder and the method of making the same; and the object of the invention is to provide a powder of this variety which is smokeless, of a uniform composition, and which is reliable in combustion.

A still further object is to form the powder of ingredients which will not burn separately, which are cheap, and which can be combined with comparatively no danger.

A still further object is to provide a powder which will have no corroding effect, which has a high degree of penetration, and which will leave little, if any, residue subsequent to the explosion thereof.

The composition consists of the following ingredients in the proportions stated: granulated sugar, fourteen ounces; potassium nitrate, four ounces; powdered potassium chlorate, fourteen ounces; magnesium oxid, one ounce; pure water, six ounces.

It will of course be understood that the chemicals employed must be of a high quality, the sugar being utilized to furnish the required carbon, while the water is employed for supplying the oxygen and hydrogen necessary.

In compounding the powder the granulated sugar is thoroughly mixed with the potassium nitrate, and this mixture is then dissolved in the water and boiled for about twenty minutes. After the mixture has been thoroughly dissolved by boiling it is removed from the fire and allowed to cool. The potassium chlorate and the magnesium oxid are then added and worked until of the consistency of putty. The product is granulated by any suitable device for that purpose and is then allowed to dry. Powder formed in this manner and of these ingredients is capable of great expansive action when ignited and leaves practically no residue within the gun. Moreover, it has no corroding effect and is very safe to handle. By reason of the simple method of compounding it it becomes unnecessary to employ expensive apparatus in its manufacture, and therefore the powder can be produced very cheaply.

Having thus fully described my invention, what I claim as new, and desire to secure by Letters Patent, is—

1. The herein-described composition of matter consisting of granulated sugar, potassium nitrate, potassium chlorate, magnesium oxid and water.

2. The herein-described composition of matter formed of the following ingredients in the proportions stated: granulated sugar, fourteen ounces; potassium nitrate, four ounces; powdered potassium chlorate, four ounces; magnesium oxid, one ounce; and water, six ounces.

In testimony whereof I have signed my name to this specification in the presence of two subscribing witnesses.

RALPH D. PECK.

Witnesses:
 HENRY O. ANDERSON,
 OTTO R. BEHL.